United States Patent
Palagi et al.

(10) Patent No.: US 12,034,526 B2
(45) Date of Patent: Jul. 9, 2024

(54) OPTICAL ADD-DROP NETWORK ELEMENT

(71) Applicant: Telefonaktiebolaget LM Ericsson (publ), Stockholm (SE)

(72) Inventors: Alfredo Palagi, Genoa (IT); Roberto Magri, Genoa (IT); Antonio Tartaglia, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 4 days.

(21) Appl. No.: 17/911,879

(22) PCT Filed: Mar. 20, 2020

(86) PCT No.: PCT/EP2020/057874
§ 371 (c)(1),
(2) Date: Sep. 15, 2022

(87) PCT Pub. No.: WO2021/185462
PCT Pub. Date: Sep. 23, 2021

(65) Prior Publication Data
US 2023/0344540 A1 Oct. 26, 2023

(51) Int. Cl.
*H04B 10/00* (2013.01)
*H04J 14/02* (2006.01)
*H04J 14/00* (2006.01)

(52) U.S. Cl.
CPC ............................. *H04J 14/0201* (2013.01)

(58) Field of Classification Search
CPC .. H04J 14/021; H04J 14/0201; H04J 14/0204; H04J 14/0205; H04J 14/0206
See application file for complete search history.

(56) References Cited

U.S. PATENT DOCUMENTS

| | | | | |
|---|---|---|---|---|
| 6,198,571 | B1* | 3/2001 | Yang | H01S 3/1301 |
| | | | | 359/337 |
| 2002/0067523 | A1 | 6/2002 | Way | |
| 2004/0208558 | A1* | 10/2004 | Roorda | H04J 14/0206 |
| | | | | 398/57 |
| 2011/0286746 | A1 | 11/2011 | Ji et al. | |

OTHER PUBLICATIONS

Lothberg, Peter, "TeraStream—A Simplified Service Delivery Model", Presentation, Deutsche Telekom AG, Oct. 14, 2013, 1-45.
Tremblay, Christine, et al., "Agile Filterless Optical Networking", 21st International Conference on Optical Network Design and Modeling, Budapest, Hungary, May 15-17, 2017, 1-23.

* cited by examiner

*Primary Examiner* — Daniel G Dobson
(74) *Attorney, Agent, or Firm* — Weisberg I.P. Law, P.A.

(57) ABSTRACT

An add-drop network element (100) for an optical communications network. The add-drop network element comprises an optical amplifier (102) having an input port and an output port. The add-drop network element comprises also comprises an optical coupler (104) and an optical splitter (106). The optical coupler (104) comprises an add input port, a through input port and an output port, the output port of the optical coupler (104) being connected to the input port of the optical amplifier. The optical splitter (106) comprising a drop output port, a through output port and an input port, the input port of the optical splitter (106) being connected to the output port of the optical amplifier.

18 Claims, 2 Drawing Sheets

OPTICAL ADD-DROP NETWORK ELEMENT

TECHNICAL FIELD

The present invention relates to add-drop network element for an optical communications network, in general, and in particular to an add-drop network element a low number of components.

BACKGROUND

Selection of channels to add or drop in an optical network can be done by means of a fixed add-drop filter that separates the wavelengths to be dropped from those that have to pass through the node. In this way the wavelengths of the dropped channels are blocked from propagating in the through fibre and can be re-used in the add path of the same add-drop network elements. Using fixed add-drop filters requires wavelength planning across the network from initial commissioning and a modification of the wavelengths to add or drop in a network element during the lifecycle of the optical network requires changes in the hardware setting of the network element. This, in turn, requires a field engineers visiting the site of the network element to be reconfigured.

To overcome the inconvenience, time and expense associated with reconfiguration of network elements with fixed add-drop filters a remotely reconfigurable add-drop network elements were introduced. Those add-drop network elements comprise selective elements (e.g. Wavelength Selective Switches or Wavelength blockers) that can be remotely controlled to choose which wavelengths to add and drop at the network element.

This type of network elements is more expensive than a network element with a fixed add-drop filter, and the cost is a particularly important factor when the number of channels to add and drop is low because this results in significant increase of cost per channel compared to network element with a fixed add-drop filter. The architecture of remotely reconfigurable add-drop network elements is, in fact, not tailored and cost optimized for the short haul network segment.

Some of the simplest known solutions comprise 2×2×2 passive couplers are placed between two optical amplifiers on the through path, similarly to the approach used in Reconfigurable Optical Add Drop Multiplexer (ROADM). A 2×2×2 coupler comprises a 2×2 coupler for an add path and a 2×2 coupler for a drop path. Other known solutions are based on demultiplexers and multiplexers placed on an optical path between two optical amplifiers. Some variants include additional amplifiers in the add/drop paths.

These known solutions have some drawbacks:
Higher cost of the double stage optical amplification on the through path.
An attempt to avoid the double stage amplification on the through path incurs a significant line loss that must be added in order to equalize the add channels with the through channels. This is due to the high loss of the add path (e.g. 9 dB for a 1:8 splitter) and the limited output power of transceivers (especially if the desired low-cost variants are used—for example, known QSFP-DD transceiver modules have output power of −6 dBm.
The additional loss caused by avoiding double stage amplification on the through path has a strong impact on the system's link budget and this can be solved by adding another amplifier in the add path, but this, however, again increases the cost.

SUMMARY

According to a first aspect of the present invention there is provided an add-drop network element for an optical communications network. The add-drop network element comprises an optical coupler, an optical amplifier and an optical splitter. The optical amplifier comprises an input port and an output port. The optical coupler comprises an add input port, a through input port and an output port, wherein the output port of the optical coupler is connected to the input port of the optical amplifier. The optical splitter comprises a drop output port, a through output port and an input port, wherein the input port of the optical splitter is connected to the output port of the optical amplifier.

According to a second aspect of the present invention there is provided an optical communications network comprising an optical transmitter connected to an optical receiver by an optical path. The optical path comprises a plurality of add-drop network elements, wherein an individual add-drop network element comprises an optical coupler, an optical amplifier and an optical splitter. The optical amplifier comprises an input port and an output port. The optical coupler comprises an add input port, a through input port and an output port, wherein the output port of the optical coupler is connected to the input port of the optical amplifier. The optical splitter comprises a drop output port, a through output port and an input port, the input port of the optical splitter is connected to the output port of the optical amplifier.

Further features of the present invention are as defined in the dependent claims.

The present invention is particularly suitable for applications in lows cost metro, fronthaul, backhaul and aggregation IP/DWDM networks, and provides the following advantages:
  reduced cost compared to known solutions due to only one optical amplifier (preferably EDFA) required per node without impacting link budget;
  avoids overloading coherent receivers;
  allows for using of simple and inexpensive coherent transceivers having limited output power and total received power.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The solution disclosed in this document is intended to optimize the architecture for optical add-drop network elements commonly used in optical transport networks to add and drop channels at intermediate nodes (network elements) along an optical path irrespective of the network topology (e.g. chain, ring, mesh). The main intended application of this solution are optical networks in which it is possible to accept reduced performance in terms of distance and capacity in order to obtain a significant cost reduction, for example low-cost IP/DWDM network for mobile aggregation network. The disclosed solution exploits a drop and waste architecture, in which channels that are dropped are still propagated in the through path and cannot be added at subsequent add-drop nodes (add-drop network elements). The amplification in the disclosed solution uses a single optical amplifier. In a preferred embodiment an add coupler and a drop splitter are placed before and after the amplifier to simplify the channel equalization with no link budget penalty.

Figure 1:
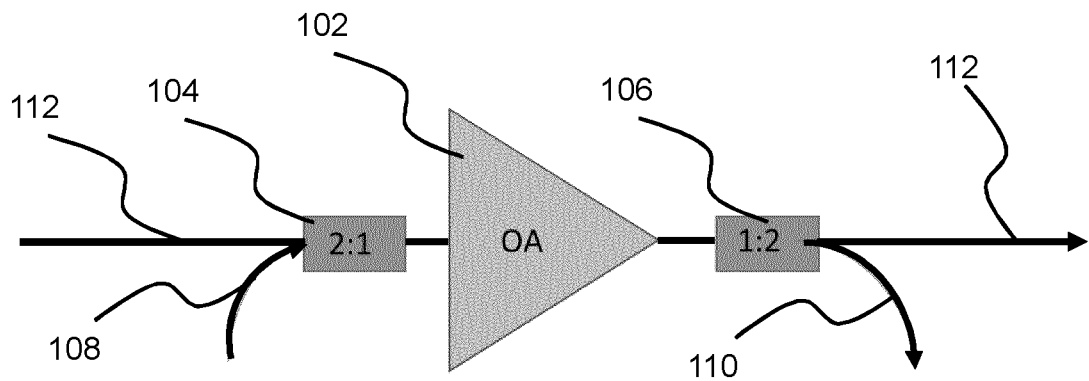
FIG. 1 is a diagram illustrating an add-drop network element in one embodiment of the present invention.

FIG. 1 illustrates one embodiment of an add-drop network element, 100, for an optical communications network. In one embodiment the add-drop network element may comprise an optical amplifier, 102, with an input port and an output port. Further, the add-drop network element, 100, may comprise an optical coupler, 104, and an optical splitter, 106. The optical coupler, 104, comprises an add input port, a through input port and an output port. In a preferred embodiment the output port of the optical coupler, 104, may be connected to the input port of the optical amplifier, 102. The optical splitter, 106, comprises a drop output port, a through output port and an input port. In a preferred embodiment, the input port of the optical splitter, 106, may be connected to the output port of the optical amplifier, 102.

In a preferred embodiment the optical amplifier, 102, comprises an Erbium Doped Fibre Amplifier.

In a preferred embodiment an optical communications network using add-drop network elements disclosed in this document may be designed to transport coherent interfaces. The solutions disclosed here work with coherent receivers with local oscillator tunability (so called ORT mode) as well as with non-coherent transceivers with an optical tunable filters in front of the receivers (either integrated or not). For simplicity and brevity of the disclosure, the description will be based on examples of a network operating with coherent receivers.

If the optical system is designed to transport coherent interfaces, then selection of the wavelengths to drop can be done by using a simple power splitter and a receiver of coherent interfaces. If add-drop network elements along an optical path in the network operate according to drop and waste principle, the channels added by network elements along the optical path accumulate because they are not blocked by the power splitter. In the drop and waste approach channels that are dropped are still propagated in the through path and cannot be added, which in effect means that once dropped the wavelength of the dropped channel is effectively wasted as it cannot be re-used. All accumulated channels are delivered to coherent receivers connected to subsequent network nodes which will likely saturate. The more add-drop network elements were before the current one the saturation of a coherent receiver is more likely. To address this problem, in one embodiment the network is designed so that communication between intermediate nodes is not allowed, the topology in this embodiment is assumed to handle traffic from remote nodes to a hub, which is typical of aggregation network. In this embodiment the add-drop network element, 100, may comprise a first band filter, 114, connected to the drop output port. The first band filter, 114, may be added on the drop path to avoid overload of a coherent receiver during colourless operation. In one embodiment the first band filter, 114, may be configured to attenuate wavelengths added via the add input ports at the preceding add-drop network elements. In a preferred embodiment, the add-drop network element may have the first band filter, 114, configured to attenuate wavelengths added at all add-drop network elements in the network. In other words, the first band filter, 114, filters out the add-wavelengths range, which means all the wavelengths belonging to the spectral region assigned to the add channels in the network. This embodiment simplifies the network because all first band filters in the network are identical. Preferably, in some embodiments, the first band filter, 114, may block the wavelengths added via the add input port.

Using the band filter, 114, on the drop path to filter out the add wavelengths helps preventing overload of a coherent receiver working in ORT mode. The ORT mode (Optical Receiver Tuning) is the capability of the coherent receiver to flexibly demultiplex a channel among many received channels by simply tuning the local oscillator to the desired channel frequency. The add-drop network element and a network operating with such an add-drop network element may operate without the band filer, 114, if the network is designed so than the number of channels delivered to the last coherent receiver (i.e. the one that terminates the optical network or in other words the one that receives a maximum number of accumulated channels in the network) does not exceed the maximum number of that the coherent receiver is capable of receiving.

Positioning of the add optical coupler, 104, before the optical amplifier, 102, and the drop optical splitter, 106, after the optical amplifier, 102, allows for avoiding the problem of equalizing the add channels with through channels known in the prior art solutions. The role of the optical amplifier, 102, is to increase the signal levels of the channels received at the input to the amplifier, 102, because the through channels are coming from the previous node and are attenuated by the fibre 112 when they arrive at the optical coupler, 104, and the amplifier, 102. The add channels are equalized to those coming from remote. The equalisation does not need to be accurate. The add-drop network element, 100, in its embodiments is designed to be cheaper than the solutions known in the art by reducing the number of elements required to implements add and drop functions in an optical network. The reduced cost makes such a product attractive for IP/DWDM optical networks for mobile aggregation and other short haul IP/DWDM optical networks where cost of components is a very important factor. At the same time, much shorter distances between nodes compared to traditional applications of WDM and DWDM mean that very accurate channel equalisation is not necessary.

In a preferred embodiment the target is to have the through channels and add channels equalised ad the output of the 2:1 optical coupler, 104. In one embodiment the splitting ratio of the optical coupler, 104, may be 50:50 but in other embodiments the splitting ratio may also be different depending on other system aspects. For example, if a low-cost transceiver connected to the add path, 108, is used and has low and not adjustable output power then we may want to fix the span loss to be always at a design value and the optical coupler, 104, is designed so that the transceiver output power arrives just equalized with the through channels for the given designed span loss. The purpose of designing the span loss and selecting appropriate splitting ratio for the optical coupler, 104, is to avoid manual settings to be carried out by a field engineer. An example is in the table 1 below.

TABLE 1

| Parameter | Value |
| --- | --- |
| Pedfa Tot Output Power | 18 dBm |
| N of chs | 32 |
| Pedfa_out/ch | 2.9 dBm |
| Fixed Span | 20 dB |
| Through @ coupler input | −17.0515 dBm |
| ADD Transceiver output | −11 dBm |
| splitter ratio | 0.8 |
| Through @ coupler out | −18 dBm |
| ADD @ coupler out | −18 dBm |

In the example illustrated in table 1, if we fix the span loss to be always 20 dB and if we have a low-cost transceiver with −11 dBm fixed output power, then the add and through channels may be equalised with an optical coupler having 20:80 splitter (20% for the through channels, 80% for the add channels). At the output port of the optical coupler, 104, the through and add channels are at more or less the same level (as discussed earlier perfect accuracy is not required), but the signal level is too low and therefore needs to be amplified by the optical amplifier, 102.

In a preferred embodiment the split ratio of the optical coupler, 104, may be selected at the design phase. In an alternative embodiment an optical coupler with a variable split ratio may be used. Optical couplers with variable split ratio are known in the art and may be based on Mach Zehnder interferometers. The splitting ratio used in actual network, whether in an optical splitter with a fixed split ratio or an optical coupler with a variable split ratio is determined in the same way as described above and depends on the span loss requirement, the power setting option and range of the transceivers, and the level of automation required. In yet another embodiment adding fixed optical attenuators instead of dimensioning the splitter and/or setting the transceiver is possible but not automatic. A fixed optical attenuator is used in optical communications networks to reduce power of the optical signal by a certain level. The power of the optical signal is reduced by absorbing the light without changing the wavelength.

Figure 2:
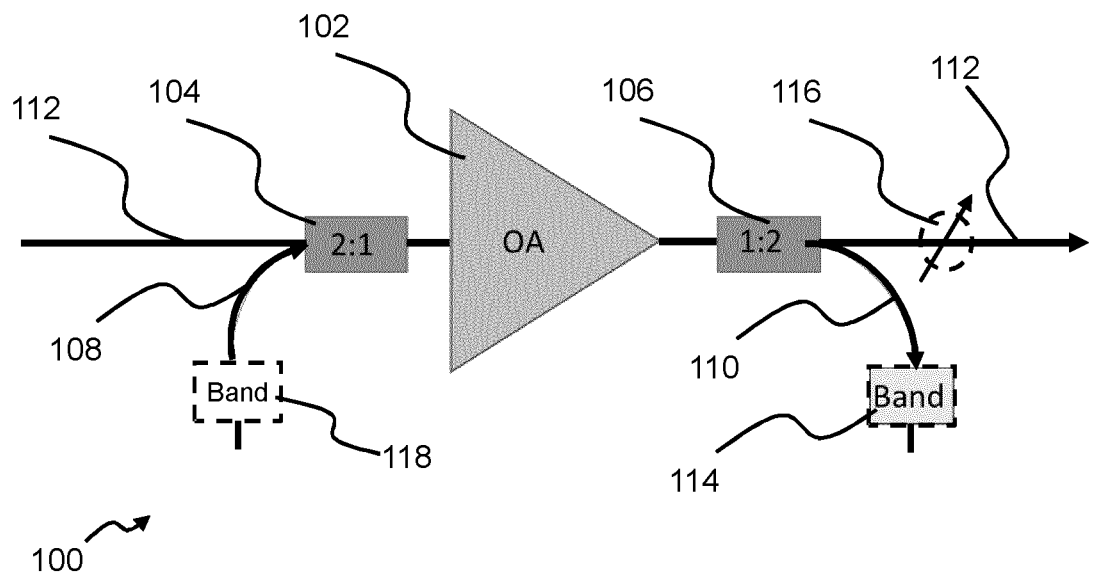
FIG. 2 is a diagram illustrating an add-drop network element in another embodiment of the present invention.

In a preferred embodiment, illustrated in FIG. 2 the add-drop network element, 100, may comprise a variable optical attenuator (VOA), 116, connected to the through output port of the optical splitter. Using a VOA may be particularly beneficial if a low-cost transceiver is connected to the add path, 108, and we want to fix the span loss to be always at a design value as described earlier. Having a VOA, 116, allows for setting the span loss at a design max value (e.g. 20 dB). The VOA, 116, in a preferred embodiment may be controlled using a supervisory channel. The supervisory channel may be used to measure and communicate the span loss. In a preferred embodiment the supervisory channel may be delivered in a DWDM multiplex.

In a preferred embodiment the variable optical attenuator, 116, operates on a DWDM multiplex output from the through output port of the optical splitter, 106, rather than on individual channels. The VOA may operate on the aggregated multiplex because this solution is designed for applications in short haul IP/DWDM networks that do not require an exact channel by channel equalisation, opposite to more expensive systems like Long Haul High Capacity Transport Systems. Given the reduced distances between nodes in these short haul systems the proposed method of equalisation of the add and through channels is good enough for stable operation of the network. The residual power differences between channels may be accounted for in the system design.

With the VOA, 116, the level of channels incoming to the next add-drop network element in a network (see FIG. 2) can be equalized with the level of the add channels. This allows further cost saving on transceivers avoiding VOA at the transceivers (or TX VOA). The VOA, 116, is placed after the optical splitter 106, opposite to solutions known in the prior art, and in this way does not affect the level of dropped channels.

For implementations requiring more flexibility in the span loss transceivers with adjustable TX power may be required (e.g. with TX VOAs) to adjust the add channel power automatically. Using transceivers with adjustable TX power allows for designing networks with add-drop network elements, 100, without the optional VOA, 116. Determining a desired splitting ratio with a specified maximum span loss (e.g. 20 dB as in the embodiment with VOA 116) will be based on the same principles as discussed earlier, but with variable TX power of the transceiver. The splitting ratio is to be designed to have the through channels and the add channels power equalized at the optical amplifier input at the specified maximum span loss. In the case of settable transceiver (i.e. transceiver with variable TX power) the minimum settable TX power must be considered in designing the network.

Due to the high add path loss caused by a passive 2:1 coupler and the limited output power of low-cost coherent transceivers that may be connected to the add path the prior art schemes, in order to equalise the power of the add and through channels, include extra amplifiers either as launch amplifier after the couplers or extra amplifier in the add/drop paths. In the solution disclosed in this document the add channels are equalized before amplification with the incoming channels from the line.

In one embodiment the optical splitter, 106, providing drop function is placed after the optical amplifier, 102, and may be dimensioned in order to match sensitivity of a receiver connected to the drop path, 110, without adding extra in-line loss. In one embodiment a 40:60 optical splitter may be used with a total line loss of the optical coupler, 104, and the optical splitter, 106, below 6 dB.

In one embodiment the optical the add-drop network element, 100, may comprise a second band filter, 118, connected to the add input port of the optical coupler, 104, and be configured to attenuate wavelengths other than wavelengths added via the add input port. The second band filter, 118, may be added on the add path to filter out noise that would overlap with through channels. While the optical transceiver connected to the add path, 108, may be configured to transmit signals in defined channels (using defined wavelengths) there may be noise outside the wavelengths (channels) designed to be added and to avoid interference with the through channels as well as channels added at subsequent nodes this noise may be attenuated (preferably blocked) by the second band filter, 118. This may be particularly beneficial for deployments with low-cost transceivers.

Figure 3:
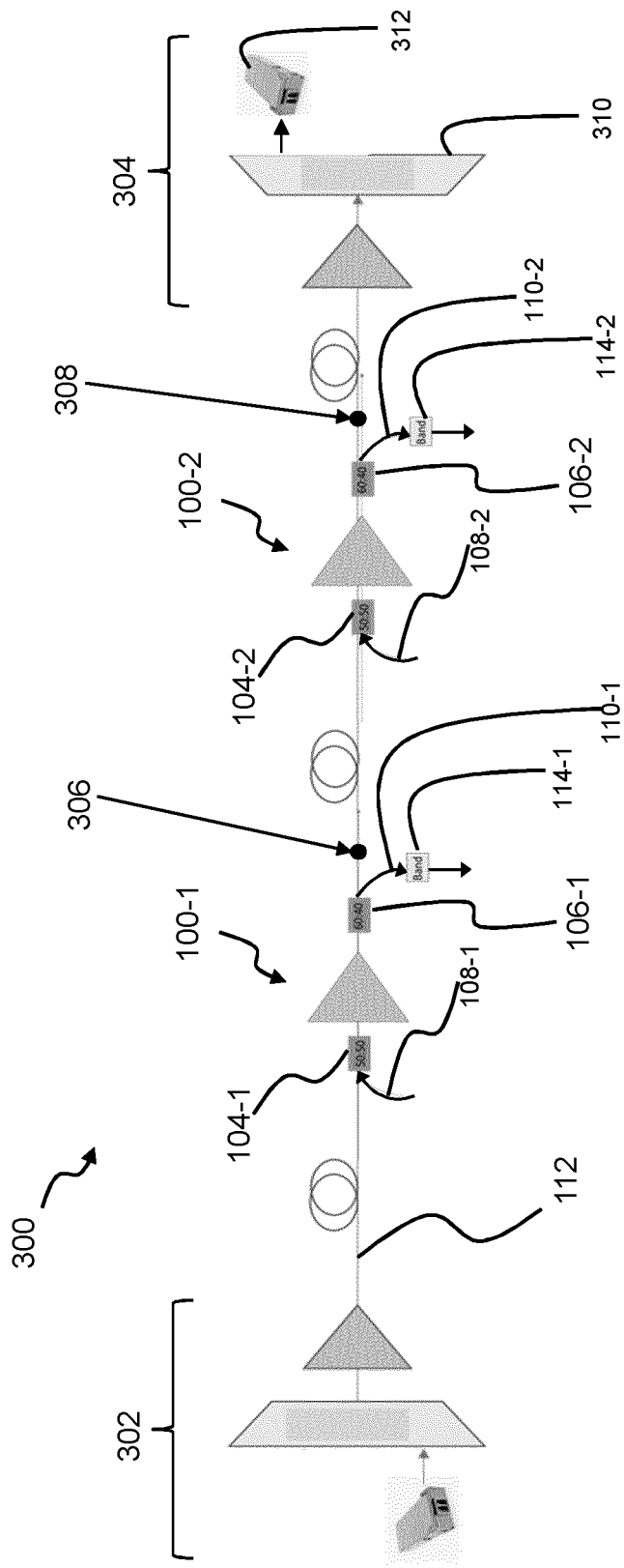
FIG. 3 is a diagram illustrating an optical communications network in one embodiment of the present invention.

FIG. 3 illustrates one embodiment of an optical communications network, 300, comprises an optical transmitter node, 302, connected to an optical receiver node, 304, by an optical path along an optical fibre, 112. The optical path comprises a plurality of add-drop network elements, 100-1, 100-2 wherein an individual add-drop network element may comprise components as described above and illustrated in FIGS. 1 and 2.

Individual add-drop network elements operate as described above so this part will not be repeated here.

From the network's perspective, the network, 300, may operate as described below. Let's assume that the coherent receivers connected to drop paths as well as the receiver in the receiver node, 304, are capable of receiving a maximum of 16 channels and that transmitters connected to add paths as well as the transmitter at the transmitter node, 302, transmit 16 channels. Due to the drop and waste scheme at a first add-drop network element, 100-1, we have 16 wavelengths in the through path at the entry to the first add-drop network element, 100-1 and 16 new wavelengths (channels) are added via the first add path 108-1. The new wavelengths added via the first add path 108-1 are different from the wavelengths of the through channels (i.e. the ones already present in the fibre 112) because otherwise the add and through wavelengths would interfere. At the output of the first add-drop network element, 100-1, marked with a dot 306, we have 32 different wavelengths travelling in the fibre, 112. All 32 wavelengths are dropped by the optical splitter, 106-1, in the first add-drop network element, 100-1. If a coherent receiver connected to the first drop path 110-1 is capable to receive a maximum of 16 channels without the risk of saturation then at least 16 channels in the multiplex travelling down the first drop path 110-1 must be attenuated (preferably blocked) by a first band filter 114-1. The same operations are carried out at a second add-drop network element 100-2, but here 32 wavelengths are already present in the fibre 112 before entering the optical coupler, 104-2, of the second add-drop network element 100-2. If another 16 wavelengths are added via the second add path 108-2 then 48 wavelengths are present at in the multiplex travelling in the fibre 112 at the point marked with a dot 308. All these 48 wavelengths go down a second drop path 110-2. When a coherent receiver is connected to the second drop path 110-2 and can receive maximum 16 wavelengths then 32 wavelengths are attenuated (preferably blocked) by a first band filter 114-2 on the second drop path 110-2. In this embodiment of the network, similar to the embodiment of the add-drop network element, 100, the first band filters 114-1 and 114-2 may be configured (or designed) identically so that each one of the first band filters attenuates (preferably blocks) all the wavelengths added by nodes 100-1 and 100-2.

In an alternative embodiment, the first band filter 114-1 in the first add-drop network element, 100-1, is configured to attenuate only the wavelengths added via the first add path 108-1 and the first band filter 114-2 in the second add-drop network element, 100-2, is configured to attenuate wavelengths added via the first add path 108-1 and the second add path 108-2. In this embodiment, a first band filter attenuates wavelengths added at its own node and at all preceding nodes.

In yet another embodiment the network may be designed to have wavelengths dedicated at design phase for communication between intermediate nodes, for example, wavelength $\lambda_1$ may be dedicated to communication from node 100-1 to node 100-2 (i.e. $\lambda_1$ is added at node 100-1 and intended for a receiver connected to the drop path 110-2 at the node 100-2. In this embodiment the first band filter 114-2 is configured to attenuate wavelengths of add channels as explained in the description of one of the earlier embodiments except for wavelength $\lambda_1$. In this embodiment each first band filter may be individually configured to exclude from attenuation of add wavelengths (i.e. to pass) the wavelength (or multiple wavelengths) intended for a receiver connected to the drop path where the first band filter operates.

In alternative embodiments instead of using band filters demultiplexers may be used to remove unwanted wavelengths from the DWDM multiplex and keep in the multiplex only the wavelengths designed to be delivered to respective coherent receivers. This option is illustrated in FIG. 2 at the node 304, which comprises a demultiplexer 310. The demultiplexer 310 delivers to the coherent receiver 312 a maximum of 16 wavelengths designed to be delivered to the receiver 312 and removes remaining 32 wavelengths from the multiplex of 48 channels (wavelengths) present at point 308 and at the input to the demultiplexer 310. Alternatively, also the receiver node 304 may comprise a band filter instead of the demultiplexer 310.

The design of the network 300 preferably includes decisions on which wavelengths are to be delivered to which one of the coherent receivers and only those wavelengths are passed through the band filters or are directed by demultiplexers to their respective coherent receivers.

For simplicity and brevity of description the embodiments illustrated in the FIGS. 1-3 and described earlier in this document are focused on unidirectional transmission. In bidirectional transmission two fibres are used and each direction uses separate add-drop network elements as illustrated in FIG. 1. Although the add-drop network elements are described as separate they may be implemented in an integrated form.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

ABBREVIATIONS

DWDM Dense Wavelength Division Multiplexing
EDFA Erbium Doped Fiber Amplifier
FEC Forward Error Correction
IP Internet Protocol
OA Optical Amplifier OADM Optical Add Drop Multiplexer
ORT Optical Receiver Tuning
P2P Point to Point
QSFP Quad Small Form Factor Pluggable
ROADM Reconfigurable Optical Add Drop Multiplexer
RX Receiver
TX Transmitter
VOA Variable Optical Attenuator
WSS Wavelength Selective Switch

The invention claimed is:

1. An add-drop network element for an optical communications network, the add-drop network element comprising:
 an optical amplifier comprising an input port and an output port;
 an optical coupler comprising an add input port, a through input port and an output port, the output port of the optical coupler being connected to the input port of the optical amplifier;
 an optical splitter comprising a drop output port, a through output port and an input port, the input port of the optical splitter being connected to the output port of the optical amplifier; and
 a variable optical attenuator connected to the through output port of the optical splitter.

2. The add-drop network element of claim 1, comprising a first band filter connected to the drop output port.

3. The add-drop network element of claim 2, wherein the first band filter is configured to attenuate wavelengths added via add input ports of all add-drop network elements in the optical communications network.

4. The add-drop network element of claim 1, wherein the variable optical attenuator is controlled via a supervisory channel.

5. The add-drop network element of claim 4, wherein the supervisory channel is delivered in a DWDM multiplex.

6. The add-drop network element of claim 1, wherein the variable optical attenuator operates on a DWDM multiplex output from the through output port of the optical splitter.

7. The add-drop network element of claim 1, wherein the optical coupler's split ratio is selected to equalize channels in the add input port and the through input port.

8. The add-drop network element of claim 1, comprising a second band filter connected to the add input port and configured to attenuate wavelengths other than wavelengths added via the add input port.

9. The add-drop network element of claim 1, wherein the optical amplifier comprises an Erbium Doped Fiber Amplifier.

10. An optical communications network comprising an optical transmitter connected to an optical receiver by an optical path, wherein the optical path comprises a plurality of add-drop network elements, wherein each individual add-drop network element comprises:
 an optical amplifier comprising an input port and an output port;
 an optical coupler comprising an add input port, a through input port and an output port, the output port of the optical coupler being connected to the input port of the optical amplifier;
 an optical splitter comprising a drop output port, a through output port and an input port, the input port of the optical splitter being connected to the output port of the optical amplifier; and
 a variable optical attenuator connected to the through output port of the optical splitter.

11. The optical communications network of claim 10, wherein each individual add-drop network element comprises a first band filter connected to the drop output port.

12. The optical communications network of claim 11, wherein the first band filter is configured to attenuate wavelengths added via add input ports of all add-drop network elements in the optical communications network.

13. The optical communications network of claim 10, wherein the variable optical attenuator of each individual add-drop network element is controlled via a supervisory channel.

14. The optical communications network of claim 13, wherein the supervisory channel is delivered in a DWDM multiplex.

15. The optical communications network of claim 10, wherein the variable optical attenuator of the individual add-drop network element operates on a DWDM multiplex output from the through output port of the optical splitter.

16. The optical communications network of claim 10, wherein the optical coupler's split ratio of the individual add-drop network element is selected to equalize channels in the add input port and the through input port.

17. The optical communications network of claim 10, wherein the individual add-drop network element comprises a second band filter connected to the add input port and configured to attenuate wavelengths other than wavelengths added via the add input port.

18. The optical communications network of claim 10, wherein the optical amplifier of the individual add-drop network element comprises an Erbium Doped Fiber Amplifier.

* * * * *